Patented Sept. 17, 1940

2,214,765

UNITED STATES PATENT OFFICE 2,214,765

PROCESS FOR RECOVERING SILVER FROM PHOTOGRAPHIC SOLUTIONS

Charles Holzwarth, Parlin, N. J., assignor to Du Pont Film Manufacturing Corp., New York, N. Y., a corporation of Delaware No Drawing. Application September 2, 1938, Serial No. 228,211

15 Claims. (Cl. 75—109)

This invention relates to photography, more particularly it relates to a process of recovering precious metals from photographic processing baths, still more particularly, it relates to the recovery of silver from spent photographic solutions. The invention further pertains to the regeneration of used photographic fixing solutions.

The recovery of precious metals from solutions particularly aqueous photographic solutions in which they are present in the form of soluble salts, has been a problem to the workers in this art. The soluble salts contained in photographic fixing solutions are usually quite complex in nature, which renders their recovery quite difficult.

Various methods of recovering precious metals, particularly silver, from the processing baths used in photography have been proposed. Among them is the practice of precipitating the silver by means of a soluble sulfide. Another comprises the electrolytic deposition of both metallic silver and silver sulfide by electrolysis of the silver-bearing solution. It has also been suggested to treat the silver-bearing baths by means of reducing agents, such as sodium hydrosulfite or partially exhausted photographic developing solutions, and thus reduce the silver to the metallic state.

This invention has for an object the economical recovery of precious metals from solutions. A further object is the economical recovery of precious metals from photographic processing solutions. A still further object is to provide a method of reducing the concentration of precious metals in solutions. A still further object is to regenerate photographic fixing baths so that they may be re-used. A still further object is to provide a novel article or agent for precipitating precious metals from solutions of their salts and collecting them. Still other objects will be apparent from the invention hereinafter described.

The above and other objects are accomplished by the following invention which comprises treating a solution containing dissolved precious metal salts with a metal, higher in the electromotive series than silver, said metal being finely divided and uniformly dispersed within an organic hydrophilic colloid and removing the colloidal mass from the solution.

The metallic precipitating agent as above stated is in a finely divided or comminuted state and is uniformly dispersed and imbedded in a hydrophilic colloid which is permeable by reason of its being swollen by aqueous solutions.

The metal-bearing colloid may be used in various forms. Thus, it may be in the form of blocks, sheets, rods, balls, tubular sections, etc. The shaped forms as above stated are introduced into the solution, whereupon the metal embedded in the colloid goes into solution and the precious metal precipitates out and agglomerates in the positions formerly occupied by the metal particles within the swollen colloid. When the precipitation has been completed or the concentration of the precious metal in the solution has been reduced to the desired extent the colloid which now contains a precious metal is removed from the bath. The metal may be recovered from the colloid in various methods. Thus, the latter may be sintered or ignited.

In the preferred embodiment of this invention, photographic fixing baths which contain dissolved silver salts such as a silver-sodium-thiosulfate complex are treated with small shreds or noodles of an organic hydrophilic or water-swellable colloid, e. g. gelatin, formaldehyde-hardened casein, agar-agar, etc., having uniformly dispersed therein finely divided metals which are higher in the electromotive series than silver, e. g. copper, aluminum, magnesium, zinc, and iron.

The invention will be further illustrated, but is not intended to be limited by the following examples in which the parts stated are parts by weight:

Example 1

Seven hundred and fifty grams of gelatin are added to 4.5 liters of cold water, the gelatin is allowed to swell and then the swelled gelatin is heated at about 50° C. until dissolved. To this solution are added 250 grams of copper powder (mesh No. 325, and grease free) with constant stirring. The mixture is then cooled and permitted to gel. The copper-gelatin jelly is then forced through a perforated extrusion plate having holes approximately $\frac{3}{32}$ of an inch in diameter. After the extruding process wherein the copper-gelatin jelly is formed into shreds or noodles ½ to 1½ inches in length, the latter are dried. Room temperature or any temperature below that which would decompose or melt the shreds may be used. The copper-bearing gelatin shreds in an amount more than sufficient to remove all the silver from a photographic fixing solution are enclosed in open-mesh cloth bags and suspended within a used photographic fixing bath. (1000 grams of gelatin noodles containing 250 grams of copper powder is in excess of the amount of copper required to displace the silver from 30 gallons of fixing bath used to the point of exhaustion due to incomplete fixation.) The fixing bath is stirred occasionally authough agitation is not absolutely necessary. At the end of about 48 hours, the bags are removed from the bath. It is found that the bath has been efficiently desilvered, the silver being retained by the gelatin shreds. The shreds are dried and ignited, leaving the metallic silver.

*Example 2*

Five hundred grams of gelatin are added to 4 liters of cold water and allowed to swell. The mixture is then heated at about 50° C. to melt the gelatin until a limpid solution is produced. 350 grams of zinc powder, known commercially as "zinc dust," or of such fineness that 97% or more passes through a No. 325 mesh, are then stirred into the gelatin solution. The zinc-gelatin solution is set to a jelly by cooling, extruded into shreds and dried. The zinc-gelatine shreds are then suspended within a non-metallic, water-penetrable container, such as a bag of nainsook or non-waterproofed canvas duck, in a used dichromate-sulfuric acid bleach-bath such as are commonly used in photographic reversal processes. In case the bleach bath has retained its acidic condition, it is neutralized by the addition of alkali such as sodium hydroxide or carbonate. In order to determine if the de-silvering of the bath is complete, a sample of the bath is de-colorized by the addition of sodium bisulfite until the solution is clear and colorless, then a few drops of 10% aqueous sodium sulfide are added to a 100 cc. sample of the bath. If the sample remains clear, the de-silvering process is completed but if a discoloration is produced, the de-silvering zinc-gelatine shreds are returned to the bath or a fresh charge of de-silverant may be used. When the bleach-bath remains unchanged in color upon the addition of sodium sulfide, the zinc-gelatin de-silverant is removed, dried and ignited. The reclaimed silver remains as the residue.

*Example 3*

One thousand grams of technical casein are added to 4 liters of boiling hot water and stirred until dissolved. 1200 grams of aluminum powder, 300 mesh, are stirred into the hot solution and then 10 cc. of commercial formalin, (40–43% formaldehyde), are added. The mixture is well stirred and then set to a jelly by immersion in chilled brine at 8° C. The set casein-aluminum jelly is then shredded by extrusion through a perforated plate whose perforations about ⅜ inch in diameter. The rod formed casein-aluminum jelly is rapidly dried on screens subject to currents of warm, dry air and the rod-sections are then broken into short aggregates by tumbling. The dried casein-aluminum aggregates are suspended in a water-permeable, non-metallic container in an exhausted fixing bath whereupon the bath is de-silvered and the silver collects within the casein shreds. By applying the sulfide test, as indicated in Example 2, the relative state of de-silvering can be determined. When the bath is completely de-silvered, the silver-casein shreds are removed and leached with a solution containing 150 grams per liter of tribasic sodium phosphate to dissolve the casein, leaving the recovered silver as a residue.

*Example 4*

Seventeen hundred grams of commercial agar-agar or Bengal isinglass are dissolved in 4 liters of hot water. The agar-agar solution is then cooled to about 40° C., and 1300 grams of powdered magnesium metal are added with constant stirring. The magnesium metal may be in the form commercially known as "magnesium dust" or in a powder form, the particle size of which being such that at least 95% is passed by a No. 150 mesh. When the magnesium metal has been thoroughly mixed in with the agar-agar solution, the mixture is chilled and the jelly pressed through "coring" molder press similar to those employed for forming smokeless powder. These cylindrical and cored sections of jelled magnesium-agar-agar may then be dried or, if desired, they may be stored under refrigerated conditions. For use, one or more of these sections are charged into a foraminous container of wood, Bakelite, hard rubber or other non-metallic, water-permeable container. The foraminous container having a charge of magnesium-agar-agar sections is then introduced into a stream of circulating fixing bath. The fixing bath stream may represent a by-passed portion of a fixing bath, drawn off from the processing tank and returnable thereto. By determining the relative concentration of silver in the fixing bath, for example, by use of the sulfide test previously described, the amount of silver in the fixing bath used in the processing tanks can be controlled inasmuch as the silver concentration is reduced as the by-pass stream percolates through the charge of magnesium precipitant.

When, for other reasons as are well recognized by the art, the bulk of a fixing bath must be discarded, it can be entirely de-silvered by treating it in storage tanks by means of the magnesium-agar-agar precipitant immersed in the manner described in the previous examples. The de-silvering action of magnesium is materially more rapid than with the precipitants previously described and thus is extremely useful for reducing the silver concentration in a fixing bath during use. The metallic silver can be recovered from the agar-agar by ignition as previously described.

It is obvious, of course, that the amount of reclaimable precious metal in a given photographic fixing, bleaching or toning bath depends on the amount of film, plates or paper processed through the particular bath. The concentration of silver, for example, in fixing baths when they are discarded may run as high as 25 grams of metallic silver per gallon. On the other hand, if the optimum of permanence of the photographic image is desired, it is established that the silver concentration of the fixing bath should not exceed 2.5 grams per gallon. Thus, the exact amount of precipitant metal required to de-silverize a given volume of silver-bearing processing bath can be determined if the concentration of recoverable silver is known. Naturally, the bath can be quantitatively analyzed for silver but such a procedure is not readily adaptable to commercial photographic processing stations. Since the sulfide test previously described will indicate if there is any remaining silver in the bath and thus show that further treatment with the precipitant is required, it is only necessary to have at least a sufficient amount of precipitant in the bath to reclaim all the precious metal in solution. The following table shows the amount of precipitant metal, not including the weight of colloid carrier, required to de-silver 25 gallons of used fixing containing 25 grams of silver per gallon:

| | Grams |
|---|---|
| Copper, pure | 192 |
| Zinc, pure | 1890 |
| Aluminum, pure | 765 |
| Magnesium, pure | 1210 |

While the above examples have described the present invention as applied in recovering silver from used fixing, bleaching and toning baths, it is evident, of course, that the recovery process, and means therefor, can be applied to any aqueous solutions containing soluble salts of other precious metals used in photography. Thus toning baths containing gold, platinum and palladium salts as well as the unused portions of sensitizing baths containing these salts can be treated in the manner described by the present invention to recover the precious metals.

In place of the specific organic hydrophilic or water-swellable colloids of the preceding examples, may be substituted any colloid which is not significantly disintegrated by aqueous solutions such as those used in photographic processes, but are readily permeable to water. As additional examples of suitable substances mention is made of gum arabic, starch, amino celluloses, etc.

This invention has the advantage that a precious metal can be easily and quickly removed from a solution containing the same in a dissolved state. The invention has the distinct advantage in the treatment of photographic solutions that foreign materials are not incorporated in the bath and it does not become contaminated. This is of particular importance in treating spent photographic fixing solutions containing dissolved silver-sodium thiosulfate complex salts. The regenerated solutions may be used over again and again since no objectionable material accumulates in the bath. A further advantage resides in the fact that the invention may be practiced by a non-skilled worker with very slight instructions. Still other advantages will be readily apparent from a reading of this case.

As many apparently widely different embodiments of this case may be made without departing from the spirit and scope thereof, it is to be understood that I do not limit myself to the specific embodiments thereof except as defined by the appended claims.

I claim:

1. A process of recovering precious metals from solutions of their salts which comprises treating the solutions with an organic hydrophilic colloid containing a finely divided metal which is higher in the electromotive series than the metal to be recovered.

2. A process of recovering precious metals from aqueous solutions of their inorganic salts which comprises treating said solutions with an organic hydrophilic colloid having uniformly distributed therethrough a finely divided metal which is higher in the electromotive series than the metal of said salt.

3. A process as set forth in claim 2 wherein said colloid is used as small shaped forms disposed in a foraminous non-metallic container.

4. A process of recovering precious metals from photographic processing solutions of their salts which comprises treating said solutions with an organic hydrophilic colloid having uniformly distributed therethrough a finely divided metal which is higher in the electromotive series than the metal of said salt.

5. A process of recovering silver from photographic fixing solutions which comprises treating said solutions with an organic hydrophilic colloid having uniformly distributed therethrough a finely divided metal which is higher in the electromotive series than the metal of said salt.

6. A process as set forth in claim 5 wherein the colloid is used as small shaped forms in a non-metallic foraminous container.

7. A process which comprises reducing the concentration of a photographic fixing bath containing a high concentration of silver salts by inserting in the bath an organic hydrophilic colloid shaped form having uniformly dispersed therein a finely divided metal which is higher in the electromotive series than silver, withdrawing said shaped form when the concentration of silver has been reduced to the desired extent for re-use in a photographic fixing operation.

8. A process which comprises reducing the concentration of a photographic fixing bath containing a high concentration of silver salts by inserting in the bath an organic hydrophilic colloid shaped form having uniformly dispersed therein finely divided copper, withdrawing the shaped forms when the concentration of silver has been materially reduced.

9. An article of manufacture comprising an organic hydrophilic colloid having uniformly distributed therein a finely divided metal which is lower in the electromotive series than silver in the form of a small cylinder.

10. An article of manufacture for photographic processes comprising a non-metallic container having disposed therein a plurality of small cylindrical organic hydrophilic colloid bodies having uniformly dispersed therein a finely divided metal which is lower in the electromotive series than silver.

11. A process as set forth in claim 7 wherein the colloid is gelatine.

12. A process as set forth in claim 7 wherein the colloid is formaldehyde-hardened casein.

13. A process as set forth in claim 7 wherein the colloid is agar-agar.

14. A process as set forth in claim 7 wherein the finely divided metal is aluminum.

15. A process as set forth in claim 7 wherein the finely divided metal is zinc.

CHARLES HOLZWARTH.